July 12, 1927. 1,635,555
P. G. MacGREGOR
INDICATING DEVICE
Filed Aug. 18, 1923 2 Sheets-Sheet 1
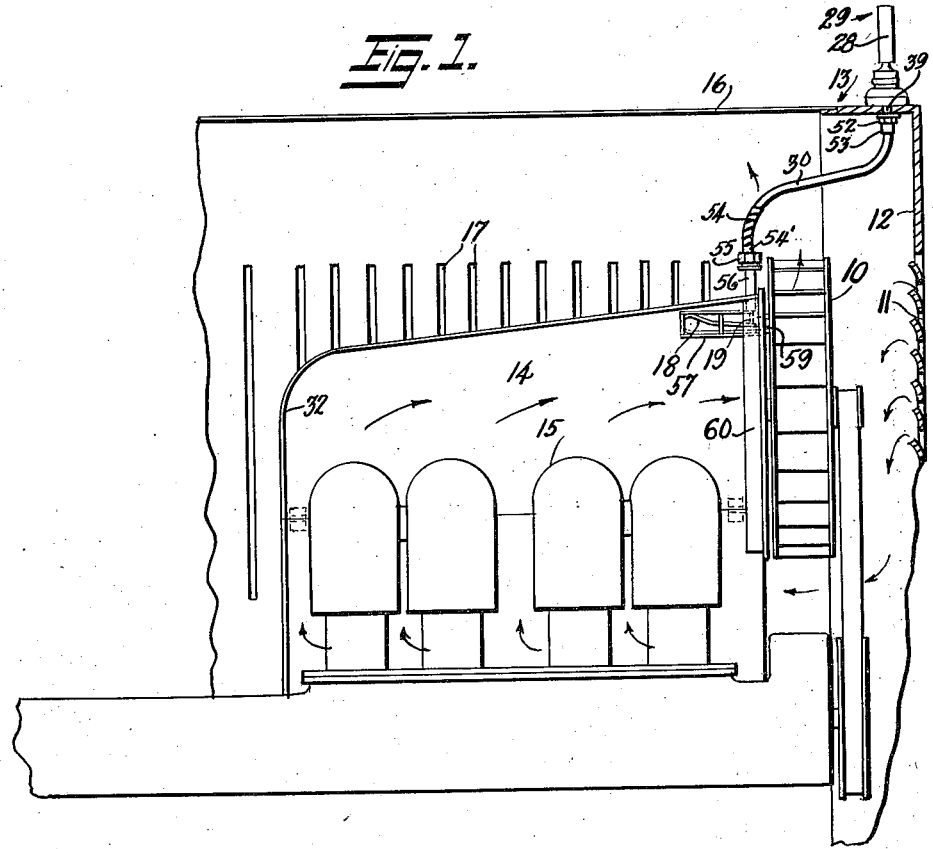
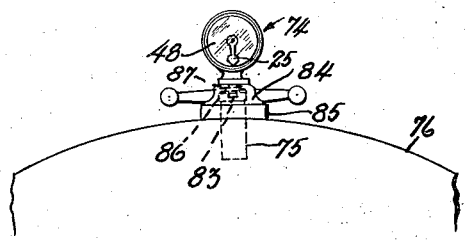
Inventor
Peter G. Mac Gregor
By his Attorney
Lewis J. Doolittle July 12, 1927.
P. G. MacGREGOR
INDICATING DEVICE
Filed Aug. 18, 1923
1,635,555
2 Sheets-Sheet 2
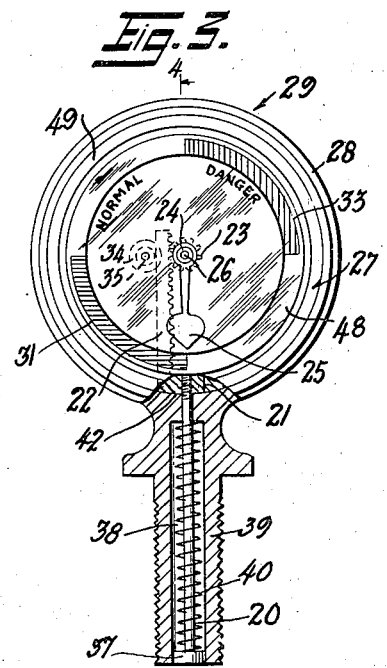
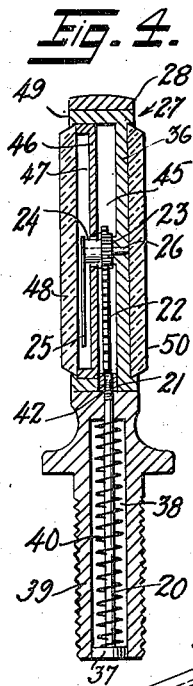
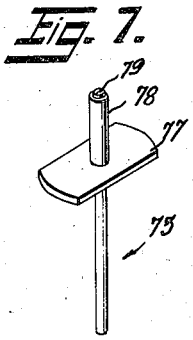
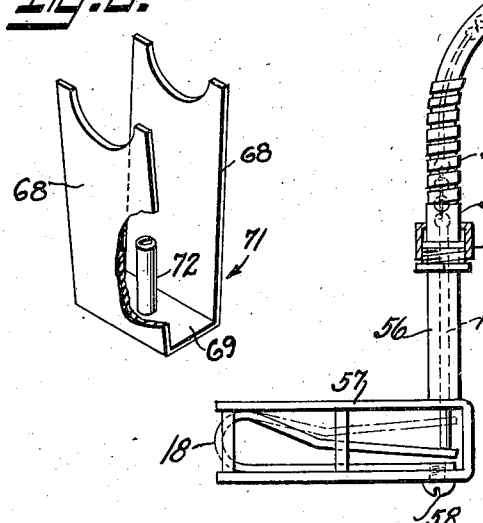
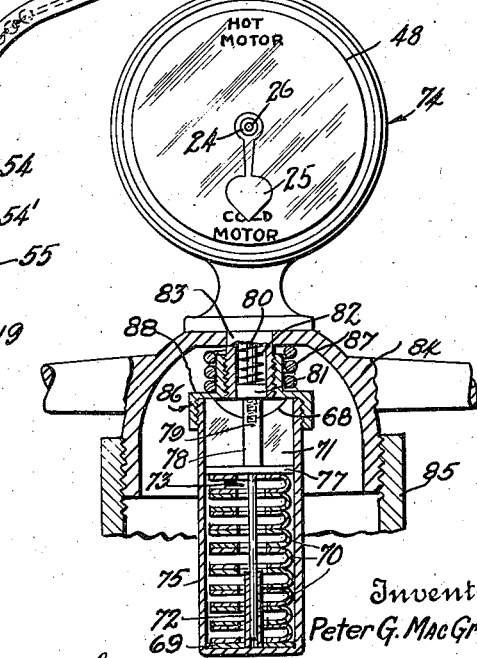
Inventor
Peter G. MacGregor.
By his Attorney
Lewis J. Doolittle Patented July 12, 1927.

1,635,555

UNITED STATES PATENT OFFICE.

PETER GRAHAM MacGREGOR, OF PEQUANNOCK, NEW JERSEY, ASSIGNOR TO PYRENE MANUFACTURING COMPANY, OF NEWARK, NEW JERSEY, A CORPORATION OF DELAWARE.

INDICATING DEVICE.

Application filed August 18, 1923. Serial No. 658,126.

This invention relates to a temperature indicating device adapted for use in connection with motor propelled vehicles, etc.

The object of the invention is to provide means for indicating the temperature of any part of an automobile motor using any type of cooling system. A further object of the invention is to provide a device of the character indicated which may be mounted in any desired location to enable the driver to conveniently observe the instrument and keep him informed of the condition of the engine while driving.

The above and other objects and advantages of the invention will appear more fully from the description of the device herein shown and described, illustrating one embodiment of the invention.

In the drawings accompanying this specification, Fig. 1 is a diagrammatical, longitudinal, sectional view through a part of the engine hood of an automobile engine of the air-cooled type, showing an application of a device embodying the invention as applied to an engine of this type.

Fig. 2 is a face view of the instrument, visible from the driver's seat, as applied to engines of the water-cooled type.

Fig. 3 is a face view, partly in section, of the device adapted to be used with an air-cooled motor, as in Fig. 1.

Fig. 4 is a sectional view of the device shown in Figs. 1 and 3, taken on the line 4—4 of Fig. 3.

Fig. 5 is a side view of the actuating means for the device shown in Figs. 3 and 4, when used as shown in Fig. 1.

Fig. 6 is a full size view, partly in section, of the device shown in Fig. 2.

Fig. 7 is a detail view, shown in perspective, of the indicator actuating rod of the device shown in Fig. 6.

Fig. 8 is a detail view, in perspective, of the expansion member guide in the device shown in Fig. 6.

Fig. 9 is a detail view, in perspective, of one of the expansion members of the device shown in Fig. 6.

In the air-cooled type of motor shown in Fig. 1, a suction fan 10 draws in air through the openings 11 in the front plate 12 of the hood support 13 and the air passes through a draft chamber 14, where it becomes heated to substantially the temperature of the engine 15, and then passes out into the hood 16 and to the outside atmosphere through openings 17 in the hood 16. The heated air in passing through the draft chamber 14 causes a bi-metallic thermal expansion member 18 to expand and actuate a flexible connection 19, (Fig. 5). The flexible connector 19 is here shown as made up of a series of rods flexibly connected one to another. The other end of the flexible connection 19 engages a shouldered rod 20, (Figs. 3–4) which is threaded at its upper end into a lug 21 of a rack 22, which is in mesh with a pinion 23. This pinion 23 has a sleeve 24 upon which a pointer or indicator 25 is secured. The pinion 23, sleeve 24 and pointer 25 are rotatably mounted upon a pin 26, which is securely fastened to an inner frame 27 contained in an outer frame 28 of the indicator mechanism 29.

It will be seen that as the expansion member 18 expands, due to the heated air in the draft chamber 14, the flexible connection 19 will be forced upwardly through a flexible tube 30, in which it is loosely carried, and engage the head 37 on the lower end of the rod 20, which is threaded into the lug 21 of the rack 22, thus moving the rack 22 upwardly and causing the pinion 23 to rotate in a clockwise direction, with the pointer 25, through an arc, the length of which will depend upon the amount of expansion of the member 18. Should the pointer, while the motor is running, point to the portion of the arc 31 (Fig. 3), which in the drawing is indicated as blue, it will indicate a wrong condition of the air circulation, which may be due to leaving the doors 32 provided in the upper portion of the draft chamber 14 open, allowing the heated air to escape directly into the hood instead of circulating properly. This will be an indication to the driver to remedy this condition.

An over-heated condition of the motor will be indicated when the pointer 25 is located anywhere in the arc 33, shown as red in the drawing and marked "Danger", (Fig. 3) while the normal or proper running condition is in the arc between the red and blue portions on the dial.

The rack 22 is guided in its movement by a guide roller 34, rotatably mounted on a pin 35 secured in a wall 36 of the casing 27, and by the head 37 of the rod 20 in the opening 38 in the threaded stem 39, which is integral with the outside casing 28. The rack 22 is returned to its original position by the action of a spring 40, positioned in the opening 38 engaging the head 37 of the rod 20, the downward movement being limited by the lug 21 on the rack 22 engaging the surface 42 of the casing 28, as shown in Figs. 3 and 4.

The rack, guide and pinion portion of the pointer operating mechanism are contained in a chamber 45 formed by the walls of the inner frame 27 and a dial plate 46. A second chamber 47 in which the pointer 25 operates is formed by a glass disk 48 abutting said dial plate. A transparent glass disk 50 may be inserted at the opposite side of the casing against the wall 36 of the frame 27 to cover any printed matter on said wall.

The entire indicating mechanism is preferably located at the front of the vehicle, as shown in Fig. 1. The stem 39 passes through an opening in the hood support 13, and is held in position, with the flexible connection 19, by a nut 52 threaded upon the stem 39 against the inner surface of the hood support 13. A shouldered guide member 53 (Fig. 5) for the flexible connection 19 is soldered to the upper portion of the tube 30 and is contained within the nut 52, thus holding the tube 30 in place at its upper end. The tube 30 has a flexible portion 54 at its lower end terminating in a shouldered guide 54', a nut 55 maintaining the guide in position on the end of a guide stem 56, attached to a bracket 57, in which the expansion member 18 is held in place by a screw 58. A bolt 59 (Fig. 1) holds said bracket in place against a flanged cover support 60, this arrangement forming a permanent and flexible connection enabling the device to withstand all the jars, etc., while the vehicle is in motion.

For the water-cooled type of motor, certain modifications of the indicator actuating mechanism may be made, as shown in Figs. 2 and 6. The indicator actuating mechanism in this arrangement consists of a series of bimetallic "U-shaped" expansion units 70 contained in a guide member 71 (Fig. 8), this guide member 71 having side walls 68 connected by a base 69, from which a tubular stem 72 extends upwardly between the side walls 68, which provides a bearing for an indicator actuating rod 73 (Fig. 6) which operates the indicator mechanism 74, which mechanism 74 being substantially the same in construction as the indicator mechanism 29 used with the air-cooled type of motor, just described.

The expansion members 70, guide 71 and actuating rod are contained within the walls of a cylindrical container 75 (Fig. 6) projecting into the interior of the radiator 76, (Fig. 2).

The action of this indicator actuating mechanism is as follows:—Due to the heat of the water or vapor in the radiator, which is approximately at the temperature of the engine, the members 70 will expand, as shown in "dot and dash" lines in Fig. 9, against a shoulder 77 of the actuating rod 73, causing the rod to rise and actuate the indicator mechanism 74. It will be seen from Figs. 6 and 7 that the actuating rod 73 has an upper portion 78 into which there is threaded a set screw 79, which is used to adjust the effective length of said rod 73. The rod 73 is guided in its movement by the stem 72 and the shoulder 77 by the walls of the cylinder 75. A rod 80, similar to rod 20 of Figs. 3 and 4, is actuated in one direction by the actuating rod 73 against a head 81 on the rod 80 and is returned by a spring 82 in a stem 83, forming a part of the casing for the indicator mechanism 74. This stem 83 passes through an opening in the cap 84 of the radiator 85 and is threaded into a cap 86 screwed on to the cylindrical container 75. A spring 87 placed between the inner surface of the cap 84 and a shoulder 88 of the cap 86 allows for proper relative positioning of the indicator mechanism and the radiator cap.

What I claim is:—

1. A device of the class described, comprising an inner casing adapted to receive a dial plate, said dial plate and walls of said inner casing forming a chamber, an indicator operating means contained within said chamber, an outer casing enclosing said inner casing and having an extension enclosing a portion of the indicator operating means, a thermal expansion member, and a flexible connecting means adapted for attachment to said extension and operatively connected at one end to said indicator operating means and at the other end to said thermal expansion member.

2. A device of the class described, comprising an indicator, indicator operating means comprising a pinion associated with said indicator, a toothed rack in engagement with said pinion, a rod adapted to actuate said rack, means on said rod for normally holding said rack in its unactuated position, a thermal expansion member, and a flexible connecting means operatively connected at one end to said rod and the other end to said expansion member.

3. A device of the class described, comprising an indicator, indicator operating means comprising a pinion associated with said indicator, a toothed rack in engagement with said pinion, a spring pressed rod adapted to actuate said rack, guiding means for said rack comprising a rotatable guide located at one end of said rack opposite the point of engagement with said pinion, a thermal expansion member, and a flexible connecting means operatively connected at one end to said rod and the other end to said expansion member.

Signed at Newark, in the county of Essex and State of New Jersey, this 31 day of July, A. D. 1923.

PETER GRAHAM MacGREGOR.